United States Patent
Yao et al.

(10) Patent No.: US 11,178,555 B2
(45) Date of Patent: Nov. 16, 2021

(54) ENHANCED NETWORK SLICE MANAGEMENT FOR WIRELESS COMMUNICATIONS

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 16/499,857

(22) PCT Filed: Apr. 25, 2018

(86) PCT No.: PCT/US2018/029452
§ 371 (c)(1),
(2) Date: Sep. 30, 2019

(87) PCT Pub. No.: WO2018/200733
PCT Pub. Date: Nov. 1, 2018

(65) Prior Publication Data
US 2020/0112861 A1    Apr. 9, 2020

Related U.S. Application Data

(60) Provisional application No. 62/491,112, filed on Apr. 27, 2017.

(51) Int. Cl.
*H04W 4/00* (2018.01)
*H04W 24/02* (2009.01)
(Continued)

(52) U.S. Cl.
CPC .......... *H04W 24/02* (2013.01); *H04L 41/0893* (2013.01); *H04W 48/18* (2013.01); *H04W 88/18* (2013.01)

(58) Field of Classification Search
CPC ..... H04W 24/02; H04W 48/18; H04W 88/18; H04W 28/04; H04W 72/04;
(Continued)

(56) References Cited

U.S. PATENT DOCUMENTS 9,369,898 B2 *  6/2016  Chun ..................... H04J 11/005
10,609,608 B2 *  3/2020  Park ....................... H04W 76/20
(Continued)

FOREIGN PATENT DOCUMENTS

WO    2016/192639 A1    12/2016

OTHER PUBLICATIONS

Extended European Search Report dated Oct. 20, 2020 for European Patent Application 18791762.0.
(Continued)

*Primary Examiner* — Chuong T Ho
(74) *Attorney, Agent, or Firm* — Eschweiler & Potashnik, LLC

(57) ABSTRACT

This disclosure describes systems, methods, and apparatuses related to enhanced network slice management. An apparatus may identify a first network slice instance management action request. The apparatus may identify a second network slice instance management action request. The apparatus may determine a coordination between the first modification and the second modification based on a received policy.

3 Claims, 14 Drawing Sheets

(51) Int. Cl.
*H04L 12/24* (2006.01)
*H04W 48/18* (2009.01)
*H04W 88/18* (2009.01)

(58) Field of Classification Search
CPC . H04W 72/0446; H04W 84/08; H04W 88/06; H04W 88/08; H04L 41/0893; H04L 5/0007
USPC .................................................. 370/329, 330
See application file for complete search history.

(56) References Cited

U.S. PATENT DOCUMENTS

| | | | | |
|---|---|---|---|---|
| 2015/0149627 | A1* | 5/2015 | Zhao | H04W 36/0061 709/224 |
| 2016/0183102 | A1* | 6/2016 | Sanneck | H04W 24/02 370/254 |
| 2017/0070892 | A1* | 3/2017 | Song | H04W 48/20 |
| 2017/0093748 | A1 | 3/2017 | Kallin et al. | |
| 2017/0303259 | A1* | 10/2017 | Lee | H04W 12/08 |
| 2017/0318450 | A1* | 11/2017 | Salkintzis | H04W 60/04 |
| 2018/0123878 | A1* | 5/2018 | Li | H04L 47/70 |
| 2018/0123961 | A1* | 5/2018 | Bar | H04L 43/0888 |
| 2018/0139106 | A1* | 5/2018 | Senarath | H04L 67/16 |
| 2018/0139107 | A1* | 5/2018 | Senarath | H04L 41/5067 |
| 2018/0241635 | A1* | 8/2018 | Rao | H04L 41/0816 |
| 2019/0104455 | A1* | 4/2019 | Park | H04W 36/0022 |
| 2019/0123963 | A1* | 4/2019 | Tang | H04W 48/18 |
| 2020/0015158 | A1* | 1/2020 | So | H04W 8/08 |
| 2020/0037146 | A1* | 1/2020 | Salkintzis | H04W 8/02 |

OTHER PUBLICATIONS

"3rd Generation Partnership Project; Technical Specification Group Services and System Aspects; Telecommunication management; Study on management and orchestration of network slicing for next generation network (Release 14)." 3GPP TR 28.801 V1.1.0 (Mar. 2017).

"3rd Generation Partnership Project; Technical Specification Group Services and System Aspects; Telecommunication management; Study on management and orchestration of network slicing for next generation network (Release 15)." 3GPP TR 28.801 V15.1.0 (Jan. 2018).

"Key principles for Slice Selection Support in RAN." Source: Nokia, Alcatel-Lucent Shanghai Bell. Agenda Item: 10.2.3. 3GPP TSG-RAN WG3 Meeting #91 bis, Bangalore, India, Apr. 11-15, 2016. R3-160735.

"Consideration on network slice selection." Source: LG Electronics Inc. Agenda Item: 10.2.3. 3GPP TSG-RAN WG3 Meeting # 91bis, Bangalore, India Apr. 11-15, 2016. R3-160755.

"Network slicing—service/traffic dependent selection." Source: NTT DOCOMO. Agenda Item: 8.1. 3GPP TSG-SA WG1 Meeting #71, Belgrade, Serbia, Aug. 17-21, 2015. S1-152156.

* cited by examiner

ENHANCED NETWORK SLICE MANAGEMENT FOR WIRELESS COMMUNICATIONS

CROSS-REFERENCE TO RELATED APPLICATION(S)

This application is a U.S. National Stage Application under 35 U.S.C. 371 and claims the priority benefit of International Application No. PCT/US2018/029452, filed Apr. 25, 2018, which claims the benefit of U.S. Provisional Application 62/491,112, filed Apr. 27, 2017, the disclosures of which are incorporated herein by reference as if set forth in full.

TECHNICAL FIELD

This disclosure generally relates to systems, methods, and devices for wireless communications and, more particularly, to enhanced network slice management.

BACKGROUND

Traditionally, equipment for wireless communications networks may be deployed as physical equipment having software and hardware bound together. However, virtualization technologies have evolved to support network function software that may be executed by commercial hardware.

DETAILED DESCRIPTION

Figure 1:
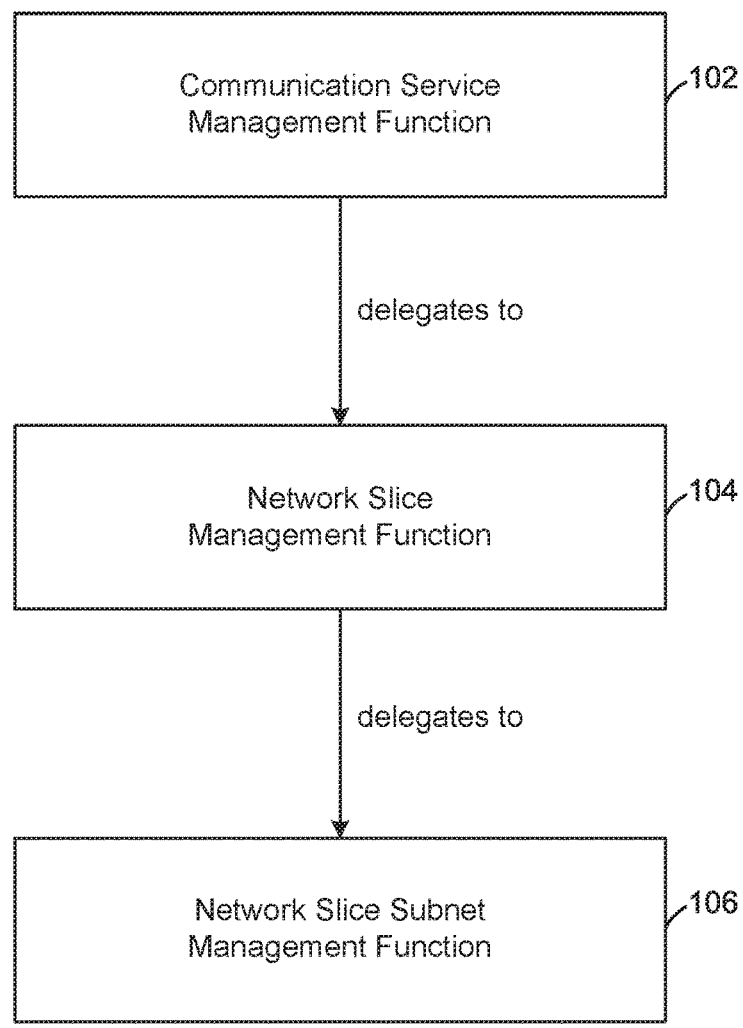
FIG. 1 depicts network slicing management functions, in accordance with one or more example embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

A cellular network may be partitioned into slices to support various service requirements, and each network slice instance may be targeted for a specific Quality of Service (QoS) requirement. The automated reconfiguration of network slice instance/network slice subnet instance (NSI/NSSI), automated optimization of NSI/NSSI, and automated healing of NSI/NSSI have been captured in a draft technical specification TR 28.801 [3GPP Draft TR 28.801: "Study on management and orchestration of network slicing for next generation network"]. These actions could all trigger the modification of the NSI/NSSI, so when these actions are requested concurrently, coordination may be needed to avoid and/or resolve a conflict.

NSI related management data sharing with customers also has been captured in the draft technical specification TR 28.801 [3GPP Draft TR 28.801: "Study on management and orchestration of network slicing for next generation network"]. However, a solution may be desirable to support NSI related management data exposure to a customer.

For example, a conflict may arise for a component network function (NF) shared between multiple NSIs when one NSI requests optimization/reconfiguration by changing a parameter of the NF (e.g., coverage related parameters of a cell), and another NSI concurrently requests to compensate a faulty NF using this NF by changing the same or a relevant parameter with a conflicting or opposite value. Because the actual modifications on the component NSSI and NF are delegated to a network slice subnet management function (NSSMF), a network slice management function (NSMF) may coordinate these management actions with the NSSMF to prevent, if possible, or to resolve the conflicts to minimize the negative impact to the NSI(s). A policy, with consideration of the assigned priority of the NSIs, may be pre-configured to the NSMF for coordination of management actions of NSI. Thus, enhanced conflict resolution and/or avoidance for NSI/NSSI management actions may be desirable.

In addition, when an NSI is offered as a service to a communication service customer, the communication service customer may need to access management data (e.g., performance measurements, alarm information) related to the NSI. It may be desirable to provide enhanced access of NSI related management data.

Embodiments herein relate to coordination of NSI management actions, coordination of NSSI management actions, and coordination of NSI management data exposure to a customer.

One or more embodiments may include a Communication Service Management Function (CSMF) supported by one or more processors able to receive the request to collect the NSI management data from a Communication Service Customer, and send a response to the Communication Service Customer with the result of the request.

One or more embodiments may include the CSMF, upon receipt of the request from Communication Service Customer being able to send a request to collect NSI management data to a Network Slice Management Function (NSMF), and receive a result from the NSMF regarding the request.

One or more embodiments may include the NSMF being able to receive a request to collect NSI management data from the CSMF, send the result to the CSMF about the request, and collect the NSI management data.

One or more embodiments may include the NSMF being able to inform the CSMF about the availability of NSI management data.

One or more embodiments may the CSMF being able is to receive information from NSMF about the availability of NSI management data; and/or obtain the NSI management data from the NSMF, and/or inform the Communication Service Customer about the availability of the NSI management data.

One or more embodiments may the Communication Service Customer being able to receive information from the CSMF about the availability of NSI management data, and/or obtain the NSI management data from the CSMF.

One or more embodiments may include the CSMF being able to inform the Communication Service Customer from which NSMF the management data may be accessed.

One or more embodiments may include the NSMF being able to inform the Communication Service Customer about the availability of NSI management data.

One or more embodiments may include the Communication Service Customer being able to receive the information from the CSMF regarding which NSMF the management data can be accessed from, and/or receive the information from the NSMF regarding the availability of NSI management data, and/or obtain the NSI management data from the NSMF.

One or more embodiments may include the CSMF being able to inform the Communication Service Customer from which NSMF the NSI management data can be requested and accessed, and/or send a request to the NSMF to authorize the Communication Service Customer to collect the management data related to NSI directly from the NSMF.

One or more embodiments may include the Communication Service Customer being able to send a request to collect NSI management data to Network Slice Management Function (NSMF), receive a result from NSMF regarding the request, and/or receive information from the NSMF regarding the availability of the NSI management data, and/or obtain the NSI management data from the NSMF.

One or more embodiments may include the NSMF being able to authorize the Communication Service Customer to collect management data related to an NSI directly from the NSMF, receive a request to collect the NSI management data from the Communication Service Customer, send a result to the Communication Service Customer regarding the request, collect the NSI management data, and/or inform the Communication Service Customer about the availability of the NSI management data.

One or more embodiments may include NSI management data having NSI related performance measurements and/or alarm information.

One or more embodiments may include the being able to coordinate management actions for an NSI to prevent and/or resolve a conflict, and/or receive policy for coordination of management actions for a NSI.

One or more embodiments may include the management actions being an automated reconfiguration of an NSI, an automated optimization of an NSI, an automated healing of an NSI, and manual modifications of an NSI.

One or more embodiments may include the Network Slice Subnet Management Function (NSSMF) being able to coordinate management actions for a Network Slice Subnet Instance (NSSI) to prevent and/or resolve a conflict, and/or receive a policy for coordination of management actions for an NSSI.

One or more embodiments may include the management actions being an automated reconfiguration of an NSSI, an automated optimization of an NSSI, an automated healing of an NSSI, and manual modifications of an NSSI.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts network slicing management functions 100, in accordance with one or more example embodiments of the present disclosure.

Referring to the management framework of slicing management functions depicted by FIG. 1, a communication service management function 102 may delegate to a network slice management function (NSMF) 104, which may delegate to a network slice subnet management function 106.

In one or more embodiments, an illustrative use case on coordination of network slicing management actions may include coordination of NSI management actions. For example, a pre-condition may be that the NSI is activated. The NSMF 104 may need to perform NSI modifications when the following events are triggered: automated reconfiguration of an NSI to support an updated network slice requirements received from the communication service management function 102. If an NSI is shared by multiple communication services, NSMF 104 may receive updated network slice requirements for each communication service, respectively. Another triggered event may include an automated optimization of an NSI, automated healing of an NSI, or manual modifications of an NSI. There may be conflicts when two or more of the management actions are requested concurrently. NSMF 104 may coordinate these management action requests to prevent, and if not evitable, resolve the conflicts to minimize the negative impact to the NSI(s).

In one or more embodiments, a policy may be received and/or pre-configured by NSMF 104 for coordination of management actions of NSI. The policy may provide rules for resolving and/or avoiding management action conflicts. For example, the policy may prioritize some modifications (e.g., prioritize some NSIs, or prioritize potential actions) over others.

There may be post-conditions for coordination of management actions. A post-condition example may be that the conflicts between the management actions of an NSI may be prevented or resolved.

A management action may include automatically reconfiguring an NSI. For example, NSMF 104 may receive updated NSI requirements and may apply modifications automatically to one or more NSIs. The NSMF 104 may monitor and/or measure an NSI periodically. If a QoS requirement (e.g., latency) is not met for the NSI, NSMF 104 may reconfigure the NSI.

In the case of one or more cells experiencing an outage, the NSMF 104 may reconfigure the cells or may use other cells. For example, cells from a neighboring network may be used to accommodate cell outages.

Enhanced coordination of management actions for NSIs may improve latency and allow cellular operations to meet short latency and high bandwidth requirements, for example.

In one or more embodiments, the NSMF 104 may optimize mobility-related parameters between two cells to solve too early or too late handovers. Meanwhile, the NSMF 104 may modify the same mobility-related parameters for load balancing between the two cells.

In one or more embodiments, coordination of NSSI management actions may occur. There may be preconditions, such as the NSSI is activated. The NSSMF 106 may perform NSSI modifications when the following events are triggered: automated reconfiguration of an NSSI to support updated network slice subnet related requirements received from NSMF 104. Another triggered event may include automated optimization of and NSSI, automated healing of an NSSI, or manual modifications of an NSSI. There may be conflicts when two or more of the management actions are requested concurrently. NSSMF 106 may coordinate these management actions to prevent, and if not evitable, resolve the conflicts to minimize the negative impact to the NSSI.

In one or more embodiments, a policy may be received and/or pre-configured to NSSMF 106 for coordination of management actions of NSSI. The policy may provide rules for resolving and/or avoiding management action conflicts. For example, the policy may prioritize some modifications over others.

There may be post-conditions for coordination of management actions. A post-condition example may be that the conflicts between the management actions of an NSSI may be prevented or resolved.

A management action may include automatically reconfiguring an NSSI. For example, NSSMF 106 may receive updated NSSI requirements and may apply modifications automatically to one or more NSSIs.

In one or more embodiments, NSSMF 106 may monitor and/or measure an NSSI periodically. If a QoS requirement (e.g., latency) is not met for the NSSI, NSSMF 106 may reconfigure the NSSI.

In the case of one or more cells experiencing an outage, the NSSMF 106 may reconfigure the cells or may use other cells. For example, cells from a neighboring network may be used to accommodate cell outages.

Enhanced coordination of management actions for NSSIs may improve latency and allow cellular operations to meet short latency and high bandwidth requirements, for example.

In one or more embodiments, the NSSMF 106 may optimize mobility-related parameters between two cells to solve too early or too late handovers, meanwhile, the NSSMF 106 may modify the same mobility-related parameters for load balancing between the two cells.

In one or more embodiments, there may be requirements for coordination of network slicing management actions. For example, cellular communications may be required to meet short latency and/or high bandwidth requirements.

NSMF 104 may be able to prevent the conflict between automated NSI management actions, and the conflict between automated and non-automated NSI management actions. NSMF 104 may be able to resolve the conflict between automated NSI management actions, and the conflict between automated and non-automated NSI management actions. NSMF 104 may be able to allow pre-configuration of a policy for coordination of NSI management actions.

In one or more embodiments, there may be requirements for coordination of NSSI management actions. To coordinate NSSI management actions, which may conflict, NSSMF 106 may be able to prevent the conflict between automated NSSI management actions, and the conflict between automated and non-automated NSSI management actions. NSSMF 106 may be able to resolve the conflict between automated NSSI management actions, and the conflict between automated and non-automated NSSI management actions. NSSMF 106 may be able to allow pre-configuration of policy for coordination of NSSI management actions.

It is understood that the above descriptions are for purposes of illustration and are not meant to be limiting.

Figure 2A:
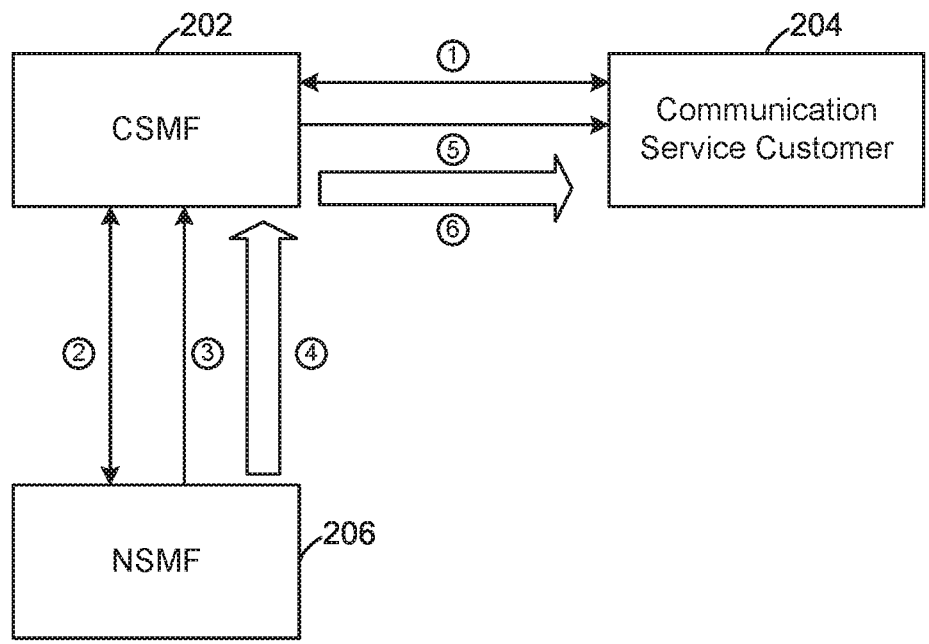
FIG. 2A depicts an illustrative process for requesting and accessing network slice instance related management data, in accordance with one or more example embodiments of the present disclosure.

FIG. 2A depicts an illustrative process 200 for requesting and accessing network slice instance related management data, in accordance with one or more example embodiments of the present disclosure.

Referring to FIG. 2A, process 200 may provide enhanced solutions for network slice management data exposure to a customer. A communication service management function (CSMF 202) may communicate with a communication service customer 204 and a network slice management function (NSMF) 206. Process 200 may facilitate NSI related management data exposure to communication service customer 204.

In one or more embodiments, when an NSI is offered as service to communication service customer 204 (e.g., see clauses 5.1.6.3 and 5.1.6.10 of 3GPP Draft TR 28.801: "Study on management and orchestration of network slicing for next generation network"), communication service customer 204 may need to access management data (e.g., performance measurements, alarm information, etc.) related to an NSI. Communication service customer 204 may access the NSI related management data by one of the following ways: request and access via CSMF 202, request via CSMF 202 and access directly from NSMF 206, and authorize by CSMF 202, and/or request and access directly from NSMF 206.

In one or more embodiments, communication service customer 204 may request and/or access NSI related management data from CSMF 202. At (1), communication service customer 204 may request to collect management data related to an NSI from CSMF 202. At (2), based on the request from communication service customer 204, CSMF 202 may request to collect the management data related to an NSI from NSMF 206. At (3), NSMF 206 may collect the management data related to an NSI and inform CSMF 202 about the availability of the management data. At (4), CSMF 202 may receive the management data from NSMF 206. At (5), CSMF 202 may inform the communication service customer 204 about the availability of the management data. At (6), communication service customer may receive the management data from CSMF 202. The communication service customer may be associated with a network/service operator, so the management data may be used by the communication service customer and/or communicated to the network/service operator.

It is understood that the above descriptions are for purposes of illustration and are not meant to be limiting.

Figure 2B:
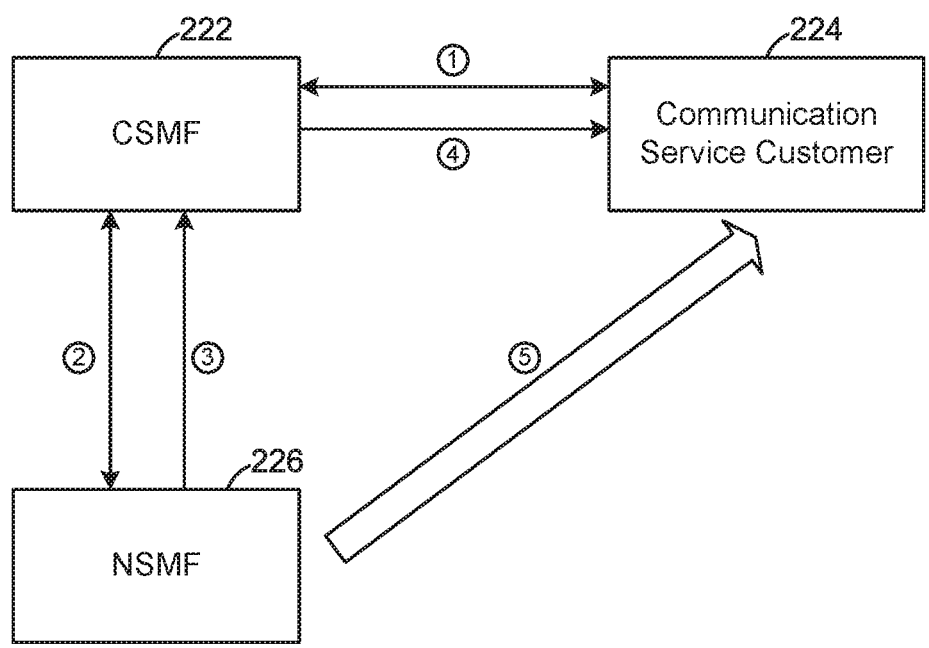
FIG. 2B depicts an illustrative process for requesting and accessing network slice instance related management data, in accordance with one or more example embodiments of the present disclosure.

FIG. 2B depicts an illustrative process 220 for requesting and accessing network slice instance related management data, in accordance with one or more example embodiments of the present disclosure.

Referring to FIG. 2B, process 220 may provide enhanced solutions for network slice management data exposure to a customer. A CSMF 222 may communicate with a communication service customer 224 and an NSMF 226. Process 220 may facilitate NSI related management data exposure to communication service customer 224.

In one or more embodiments, communication service customer 224 may request NSI management data via CSMF 222, and may access the NSI management data directly from NSMF 226. At (1), communication service customer 224 may request to collect the management data related to an NSI from CSMF 222. At (2), per the request from communication service customer 224, CSMF 222 may request to collect the management data related to an NSI from NSMF 226. At (3), NSMF 226 may collect the management data related to an NSI and inform CSMF 222 about the availability of the management data. At (4), CSMF 222 may inform communication service customer 224 about the availability of the management data. At (5), communication service customer 224 may receive the data directly from NSMF 226. The communication service customer may be associated with a network/service operator, so the management data may be used by the communication service customer and/or communicated to the network/service operator.

It is understood that the above descriptions are for purposes of illustration and are not meant to be limiting.

Figure 3:
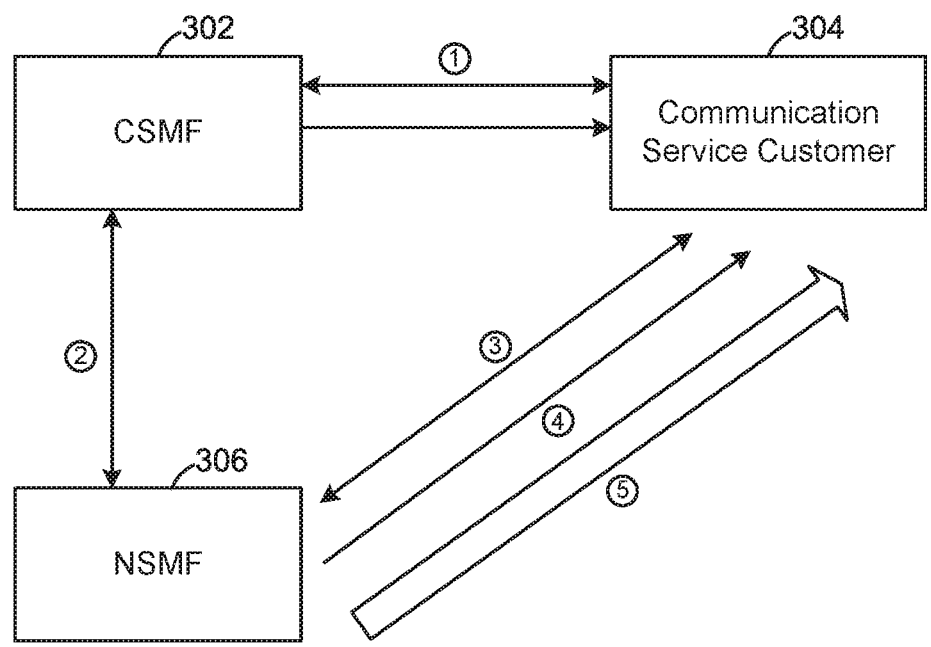
FIG. 3 depicts an illustrative process for requesting and accessing network slice instance related management data, in accordance with one or more example embodiments of the present disclosure.

FIG. 3 depicts an illustrative process 300 for requesting and accessing network slice instance related management data, in accordance with one or more example embodiments of the present disclosure.

Referring to FIG. 3, process 300 may provide enhanced solutions for network slice management data exposure to a customer. A CSMF 302 may communicate with a communication service customer 304 and an NSMF 306. Process 300 may facilitate NSI related management data exposure to communication service customer 304.

In one or more embodiments, communication service customer 304 may be authorized by CSMF 302, and may request and access NSI management data directly from NSMF 306. At (1), communication service customer 304 may request to collect the management data related to NSI from CSMF 302. CSMF 302 may inform the communication service customer 304 from which NSMF (e.g., NSMF 306) the management data may be accessed. At (2), CSMF 302 may request NSMF 306 to authorize the communication service customer 304 to collect the management data related to an NSI directly from NSMF 306. At (3), communication service customer 304 may request NSMF 306 to collect the management data. At (4), NSMF 306 may collect the management data and inform communication service customer 304 about the availability of the management data. At (5), communication service customer 304 may receive the management data from NSMF 306. The communication service customer may be associated with a network/service operator, so the management data may be used by the communication service customer and/or communicated to the network/service operator.

It is understood that the above descriptions are for purposes of illustration and are not meant to be limiting.

Figure 4A:
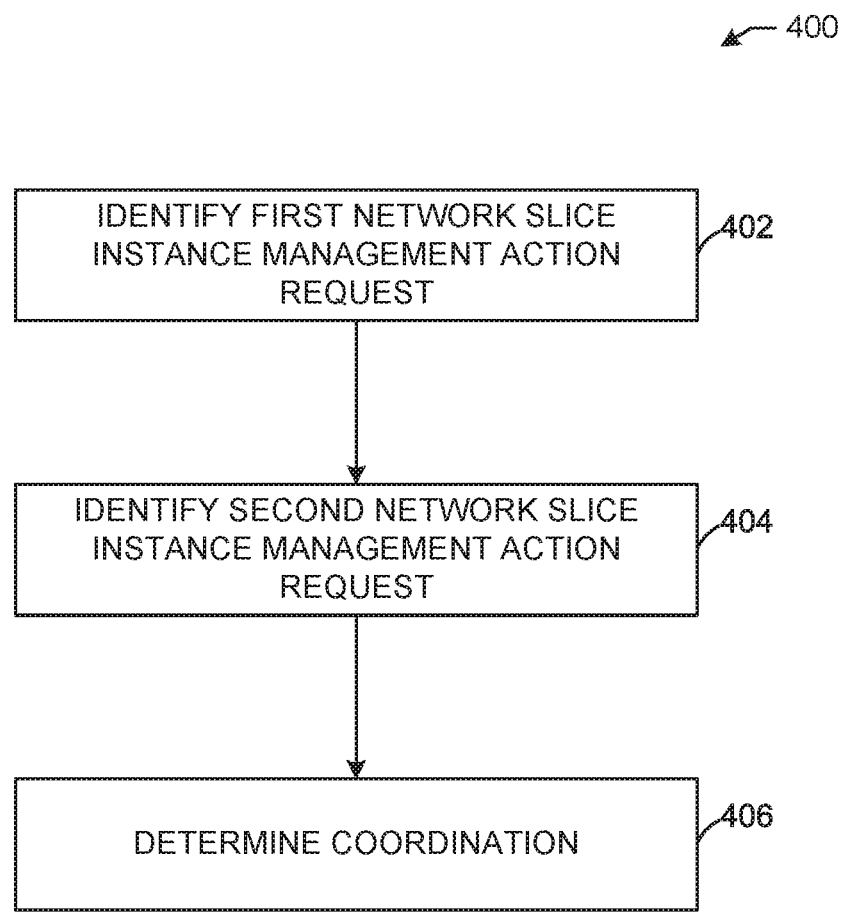
FIG. 4A illustrates a flow diagram of a process for coordinating network slice instance management action requests, in accordance with one or more example embodiments of the present disclosure.

FIG. 4A illustrates a flow diagram of a process 400 for coordinating network slice instance management action requests, in accordance with one or more example embodiments of the present disclosure.

At block 402, one or more processors (e.g., associated with NSMF 104 of FIG. 1) may identify a first NSI management action request. The NSI management request may be received from a communication service management function (e.g., CSMF 102 of FIG. 1) or triggered by the NSMF, and the first NSI management action request may be associated with a first modification request of an active NSI for one or more devices of a cellular network. The NSMF may also receive a policy for coordinating the management action requests. For example, the policy may instruct the NSMF regarding priorities of NSIs and/or potential actions associated with one or more NSIs. Mobility-related parameters associated with two cells, for example, may be affected by management action requests, and changing mobility-related parameters may result in too early or too late handovers and/or parameter changes which may result in a network not meeting latency and/or bandwidth requirements. The policy may provide instructions for managing management action requests to avoid or resolve conflicts.

At block 404, the one or more processors may identify a second NSI management action request. The second NSI management request may be received from a communication service management function (e.g., CSMF 102 of FIG. 1) or triggered by the NSMF, and the second NSI management action request may be associated with a second modification request of the active NSI. The second modification request may conflict with the first modification request. The policy may be used by the NSMF to determine a conflict avoidance or resolution of the first and second modifications. For example, rather than responding sequentially to each individual management action request, multiple management action requests may be considered, and an optimal response may be determined.

At block 406, the one or more processors may determine a coordination between the first modification request and the second modification request based on a received policy. The first and second NSI management action requests may be associated with any combination of automated reconfiguration of the active NSI, automated optimization of the active NSI, automated healing of the active NSI, or manual modification of the active NSI. For example, network management functions may be reconfigured. An active NSI may be monitored and measured to determine, for example, if a latency and/or bandwidth requirement is not being met, and if not, then the NSI may be reconfigured by the NSMF. If a cell outage occurs, for example, other cells (e.g., neighbor cells) may be reconfigured.

In one or more embodiments, at least a portion of logic of a device or apparatus may be in hardware and may include computer-executable instructions to perform process 400.

It is understood that the above descriptions are for purposes of illustration and are not meant to be limiting.

Figure 4B:
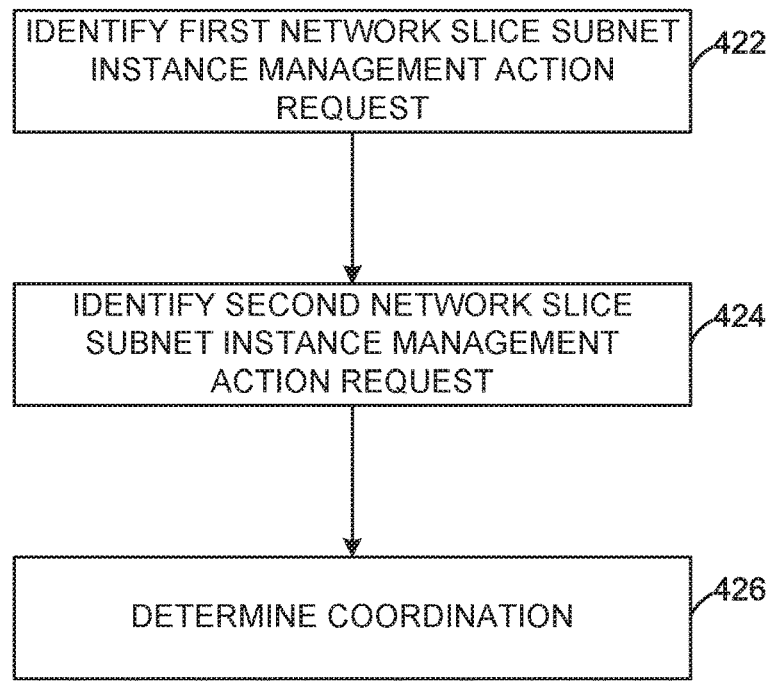
FIG. 4B illustrates a flow diagram of a process for coordinating network slice subnet instance management action requests, in accordance with one or more example embodiments of the present disclosure.

FIG. 4B illustrates a flow diagram of a process 420 for coordinating network slice subnet instance management action requests, in accordance with one or more example embodiments of the present disclosure.

At block 422, one or more processors (e.g., associated with NSSMF 106 of FIG. 1) may identify a first NSSI management action request. The first NSSI management action request may be received from a communication service management function (e.g., CSMF 102 of FIG. 1) or triggered by the NSSMF, and the first NSSI management action request may be associated with a first modification request of an active NSSI for one or more devices of a cellular network. The NSSMF may also receive a policy for coordinating the management action requests. For example, the policy may instruct the NSSMF regarding priorities of NSSIs and/or potential actions associated with one or more NSSIs. Mobility-related parameters associated with two cells, for example, may be affected by management action requests, and changing mobility-related parameters may result in too early or too late handovers and/or parameter changes which may result in a network not meeting latency and/or bandwidth requirements. The policy may provide instructions for managing management action requests to avoid or resolve conflicts.

At block 424, the one or more processors may identify a second NSSI management action request. The second NSSI management action request may be received from a CSMF or triggered by the NSSMF, and the second NSSI management action request may be associated with a second modification request of the active NSSI. The second modification request may conflict with the first modification request. The policy may be used by the NSSMF to determine a conflict avoidance or resolution of the first and second modifications. For example, rather than responding sequentially to each individual management action request, multiple management action requests may be considered, and an optimal response may be determined.

At block 426, the one or more processors may determine a coordination between the first modification request and the second modification request based on a received policy. The first and second NSSI management action requests may be associated with any combination of automated reconfiguration of the active NSSI, automated optimization of the active NSSI, automated healing of the active NSSI, or manual modification of the active NSSI. For example, network management functions may be reconfigured. An active NSSI may be monitored and measured to determine, for example, if a latency and/or bandwidth requirement is not being met, and if not, then the NSSI may be reconfigured by the NSSMF. If a cell outage occurs, for example, other cells (e.g., neighbor cells) may be reconfigured.

In one or more embodiments, at least a portion of logic of a device or apparatus may be in hardware and may include computer-executable instructions to perform process 420.

It is understood that the above descriptions are for purposes of illustration and are not meant to be limiting.

Figure 4C:
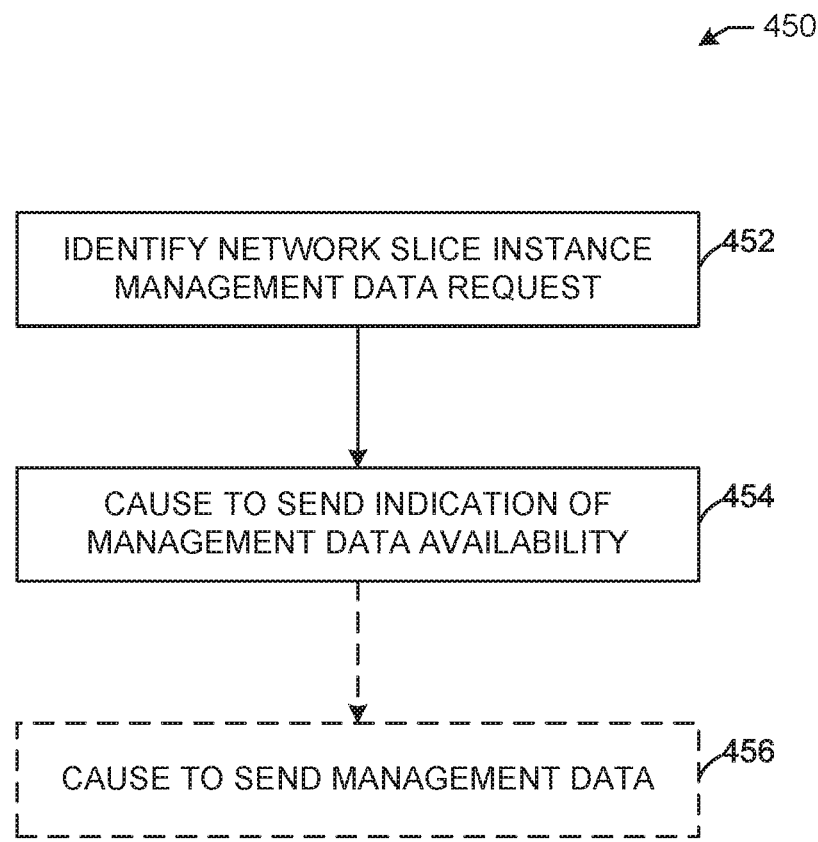
FIG. 4C illustrates a flow diagram of a process for managing network slice management data exposure, in accordance with one or more example embodiments of the present disclosure.

FIG. 4C illustrates a flow diagram of a process 450 for managing network slice management data exposure, in accordance with one or more example embodiments of the present disclosure.

At block 452, one or more processors of a device (e.g., NSMF 206 of FIG. 2A, NSMF 226 of FIG. 2B, NSMF 306 of FIG. 3) may identify a management data request. The management data request may be received for a communication service customer (e.g., communication service customer 204 of FIG. 2A, communication service customer 224 of FIG. 2B, communication service customer 304 of FIG. 3), and the management data request may be associated with an NSI used by one or more devices of a cellular network.

At block 454, the one or more processors may cause to send an indication of an availability of the management data. The availability indication may be sent to a CSMF (e.g., CSMF 202 of FIG. 2A, CSMF 222 of FIG. 2B, CSMF 302 of FIG. 3) or to a communication service customer (e.g., communication service customer 204 of FIG. 2A, communication service customer 224 of FIG. 2B, communication service customer 304 of FIG. 3) associated with the NSI.

At block 456, the one or more processors may cause to send the management data received for the network slice management function, the management data associated with the NSI. The management data may be sent to the CSMF or to the communication service customer.

In one or more embodiments, at least a portion of logic of a device or apparatus may be in hardware and may include computer-executable instructions to perform process 450.

It is understood that the above descriptions are for purposes of illustration and are not meant to be limiting.

Figure 5:
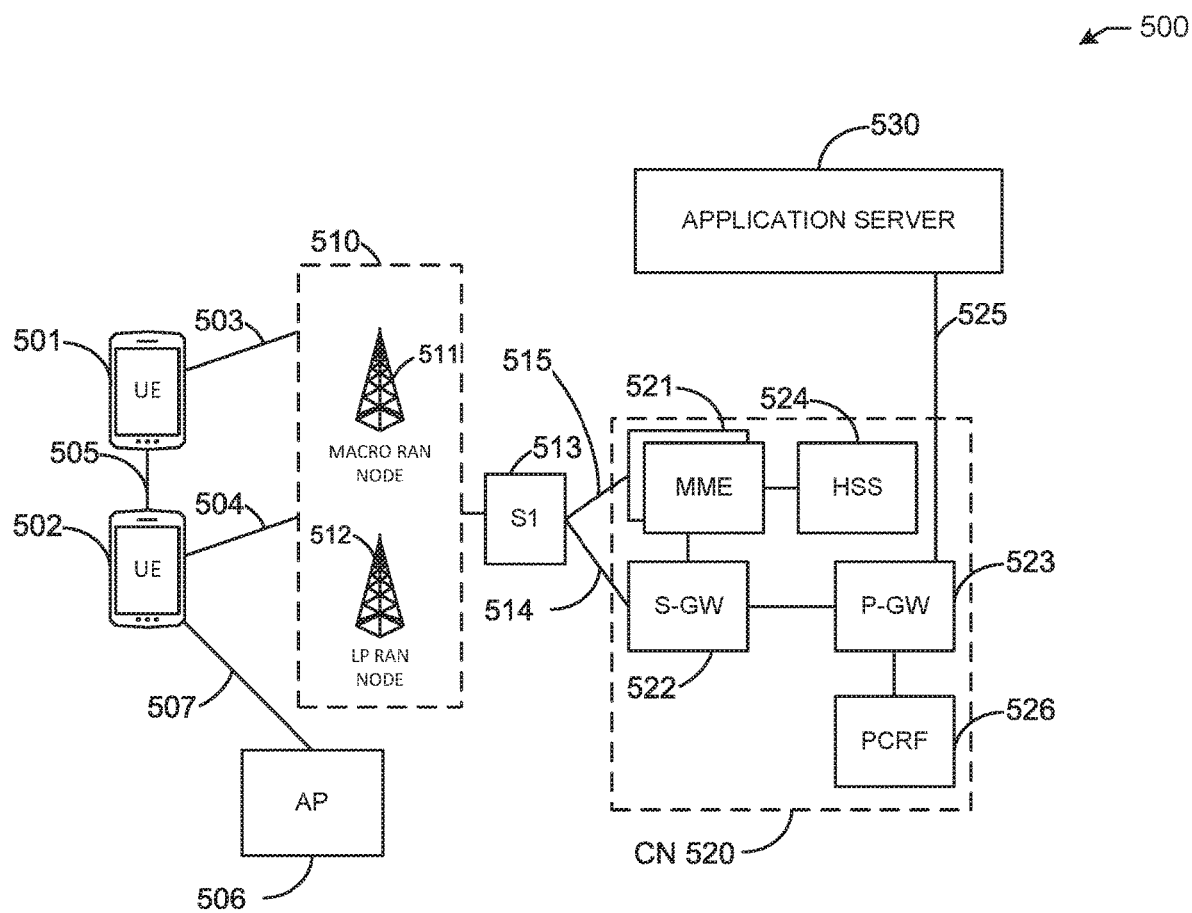
FIG. 5 illustrates an architecture of a system of a network, in accordance with one or more example embodiments of the present disclosure, of a system to support network function virtualization (NFV).

FIG. 5 illustrates an architecture of a system 500 of a network, in accordance with one or more example embodiments of the present disclosure.

The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), a 5G Core Network (5GC), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel Typically, downlink scheduling (assigning control and shared channel resource blocks to the UE within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate a SGi interface toward a PDN. The P-GW 523 may route data packets between an EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
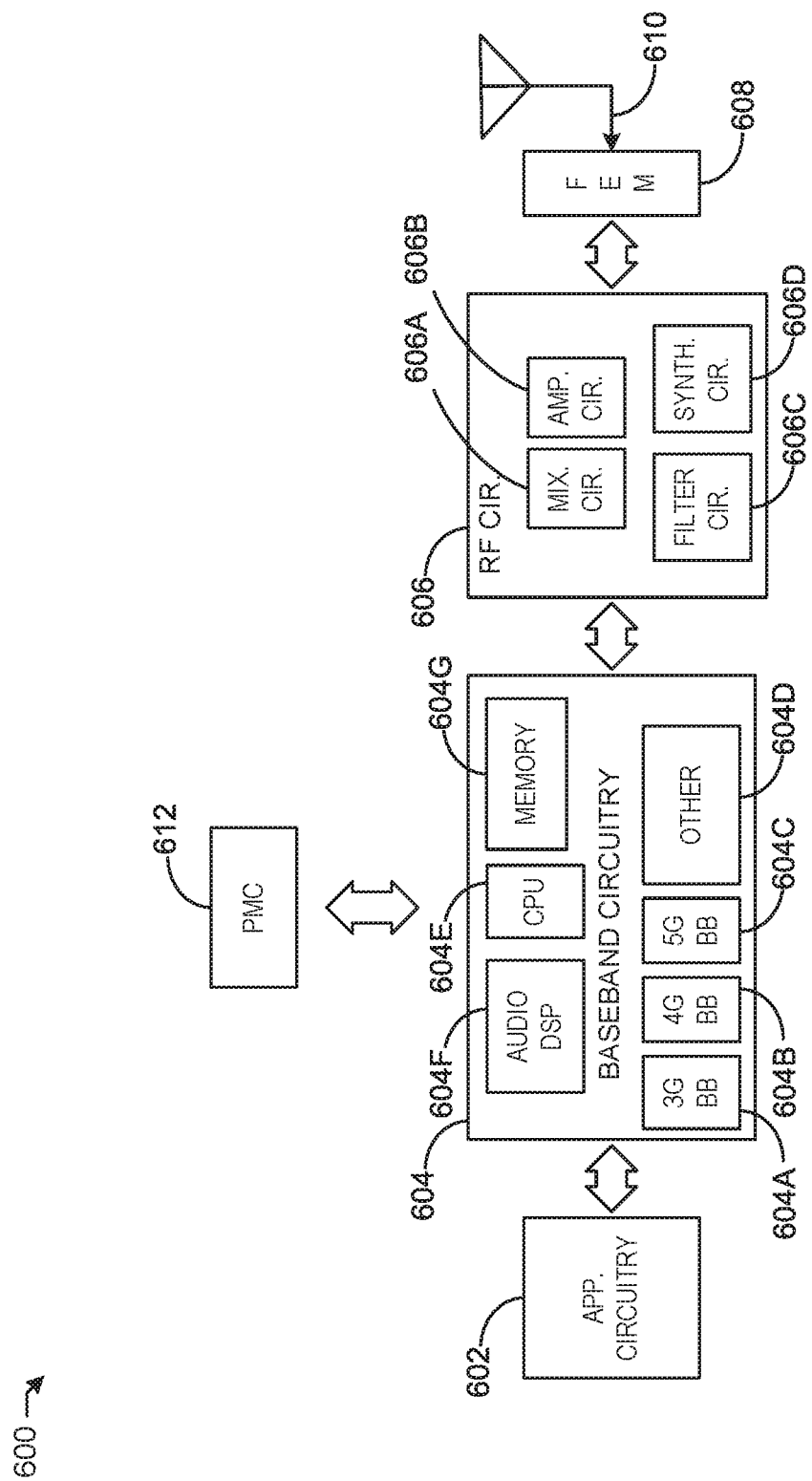
FIG. 6 illustrates example components of a device, in accordance with one or more example embodiments of the present disclosure.

FIG. 6 illustrates example components of a device 600, in accordance with one or more example embodiments of the present disclosure.

In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), si6h generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), preceding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC (direct current) conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
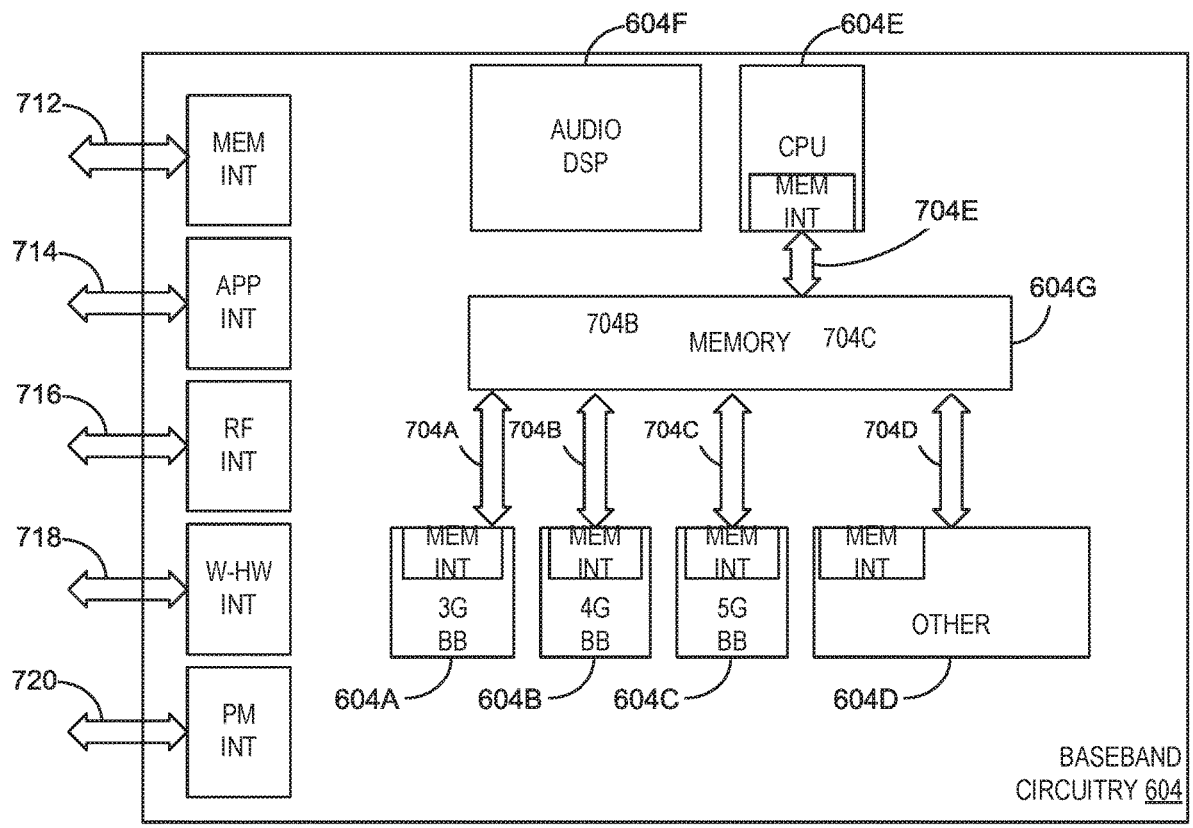
FIG. 7. illustrates example interfaces of baseband circuitry, in accordance with one or more example embodiments of the present disclosure.

FIG. 7 illustrates example interfaces of baseband circuitry, in accordance with one or more example embodiments of the present disclosure.

As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory e6ernal to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
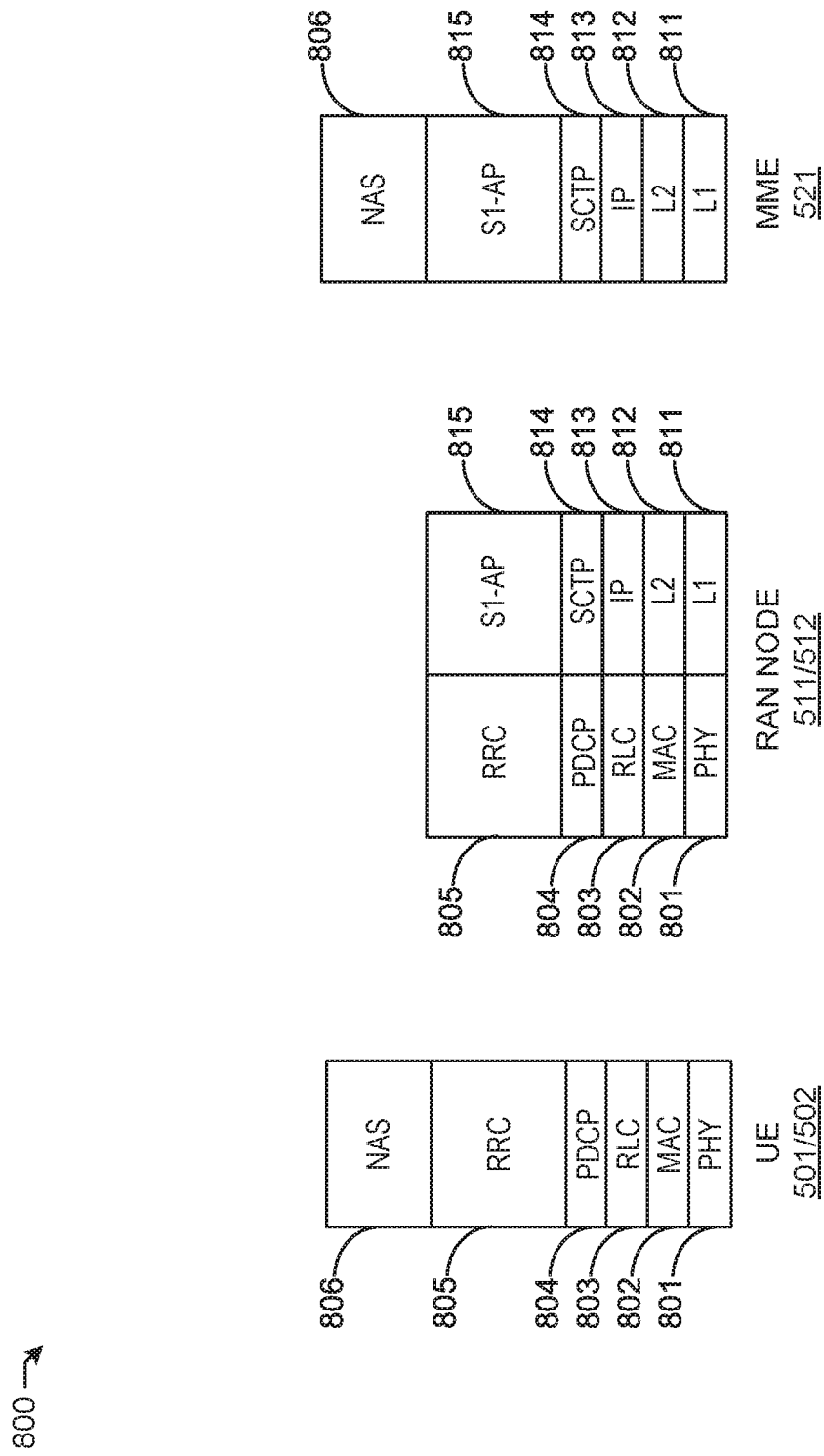
FIG. 8 is an illustration of a control plane protocol stack, in accordance with one or more example embodiments of the present disclosure.

FIG. 8 is an illustration of a control plane protocol stack, in accordance with one or more example embodiments of the present disclosure.

In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data 913, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523 of FIG. 5.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
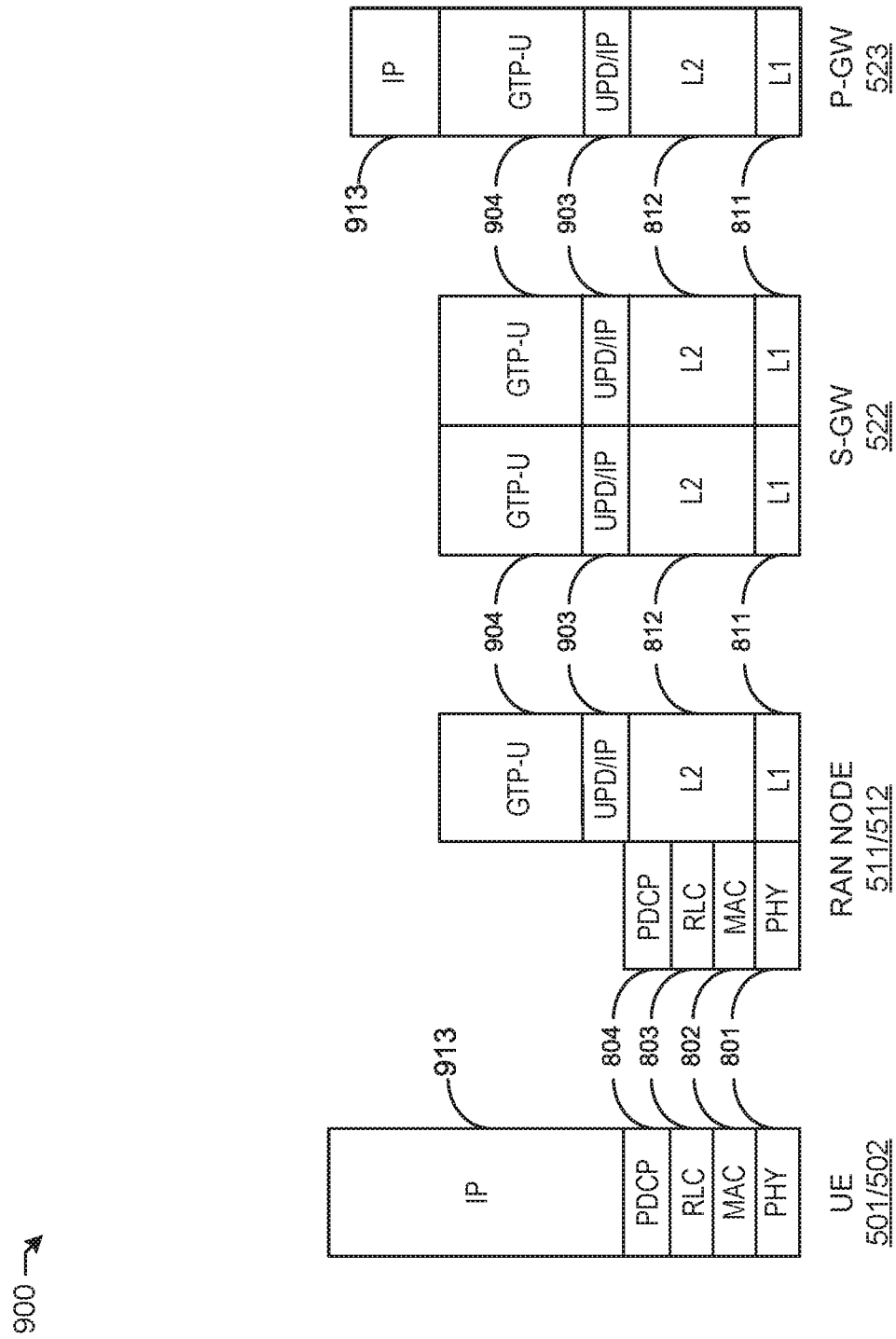
FIG. 9 is an illustration of a user plane protocol stack, in accordance with one or more example embodiments of the present disclosure.

FIG. 9 is an illustration of a user plane protocol stack, in accordance with one or more example embodiments of the present disclosure.

In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 903 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L1 layer 812, the UDP/IP layer 903, and the GTP-U layer 904. The S-GW 522 and the P-GW 523 may utilize an S5/S8a interface to exchange user plane data via a protocol stack comprising the L1 layer 811, the L2 layer 812, the UDP/IP layer 903, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
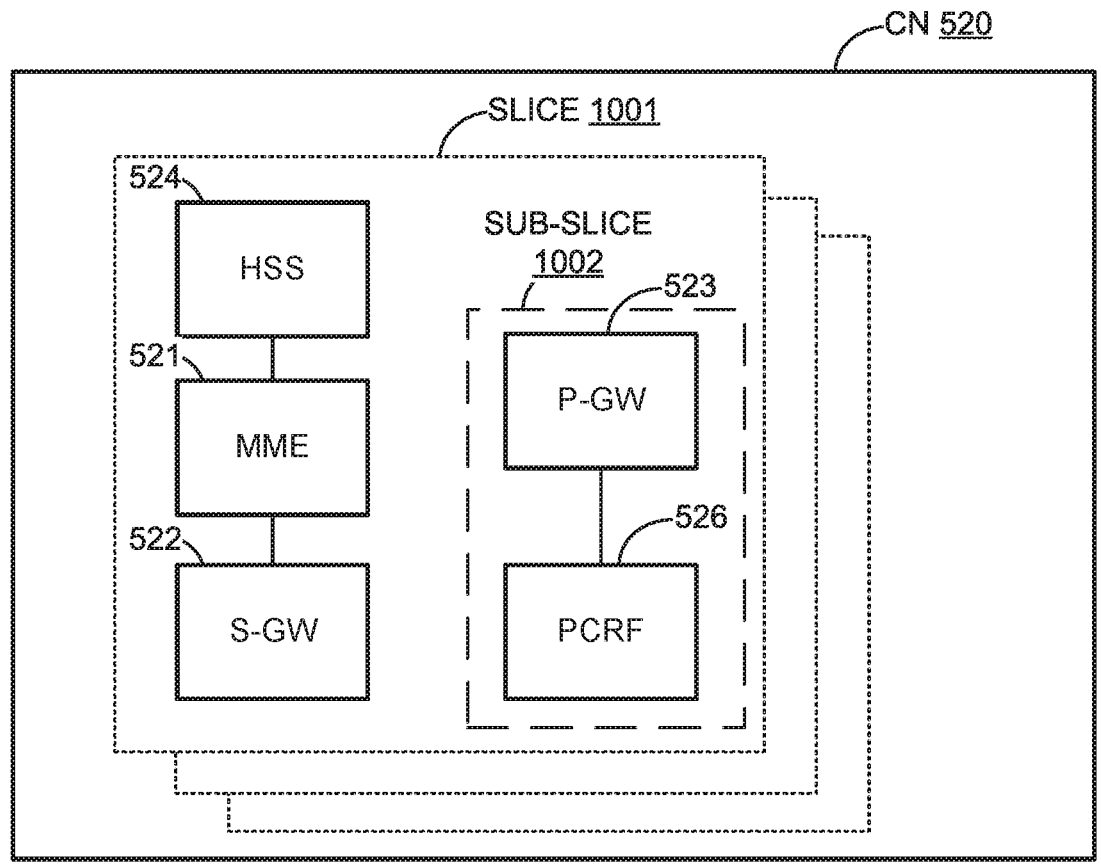
FIG. 10 illustrates components of a core network, in accordance with one or more example embodiments of the present disclosure.

FIG. 10 illustrates components of a core network, in accordance with one or more example embodiments of the present disclosure.

The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. The network slice 1001 may include an HSS 524, an MME 521, an S-GW 522, in addition to a network sub-slice 1002. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
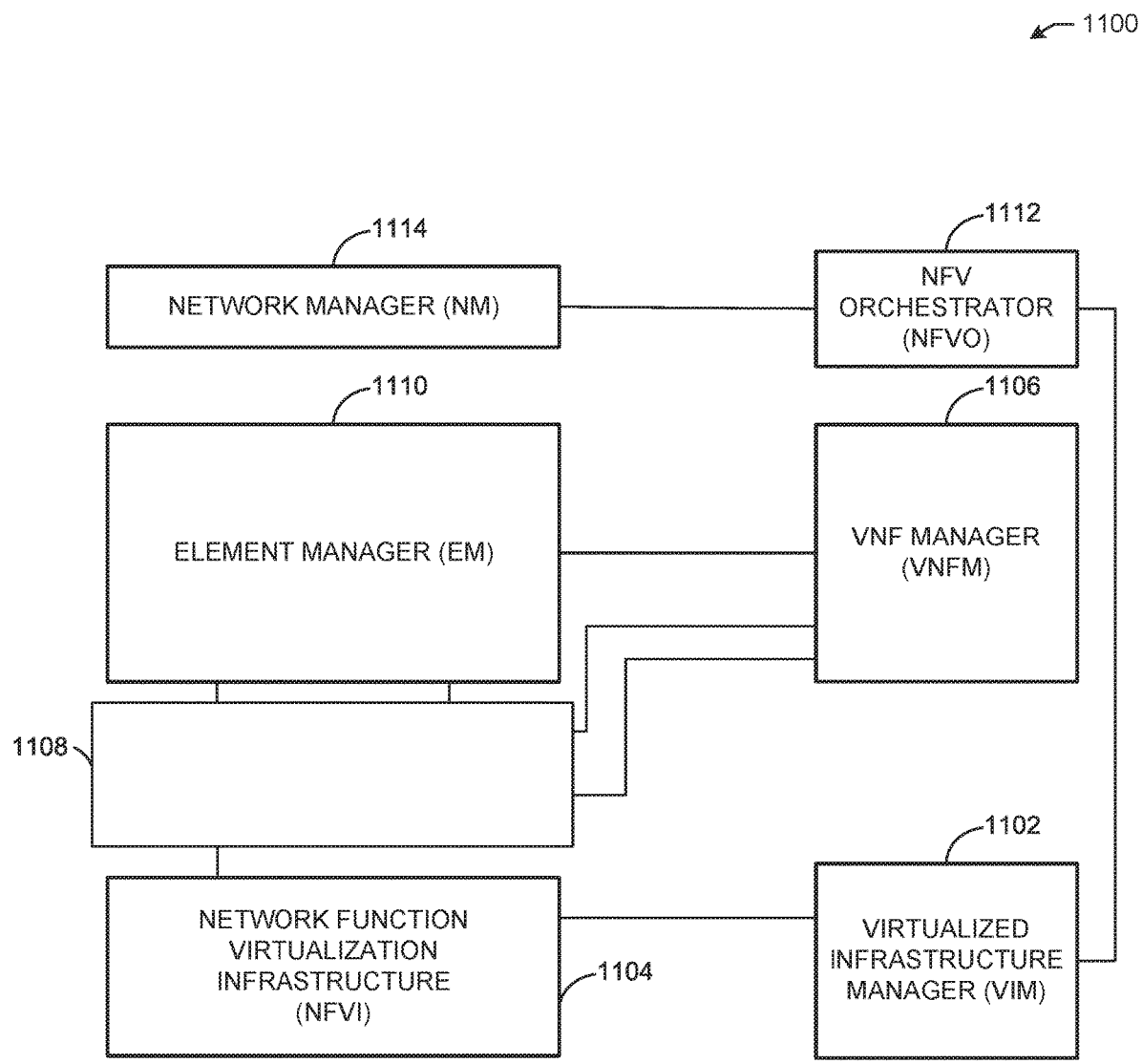
FIG. 11 is a block diagram illustrating components of a system to support network function virtualization, in accordance with one or more example embodiments of the present disclosure.

FIG. 11 is a block diagram illustrating components of a system 1100 to support NFV, in accordance with one or more example embodiments of the present disclosure.

The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
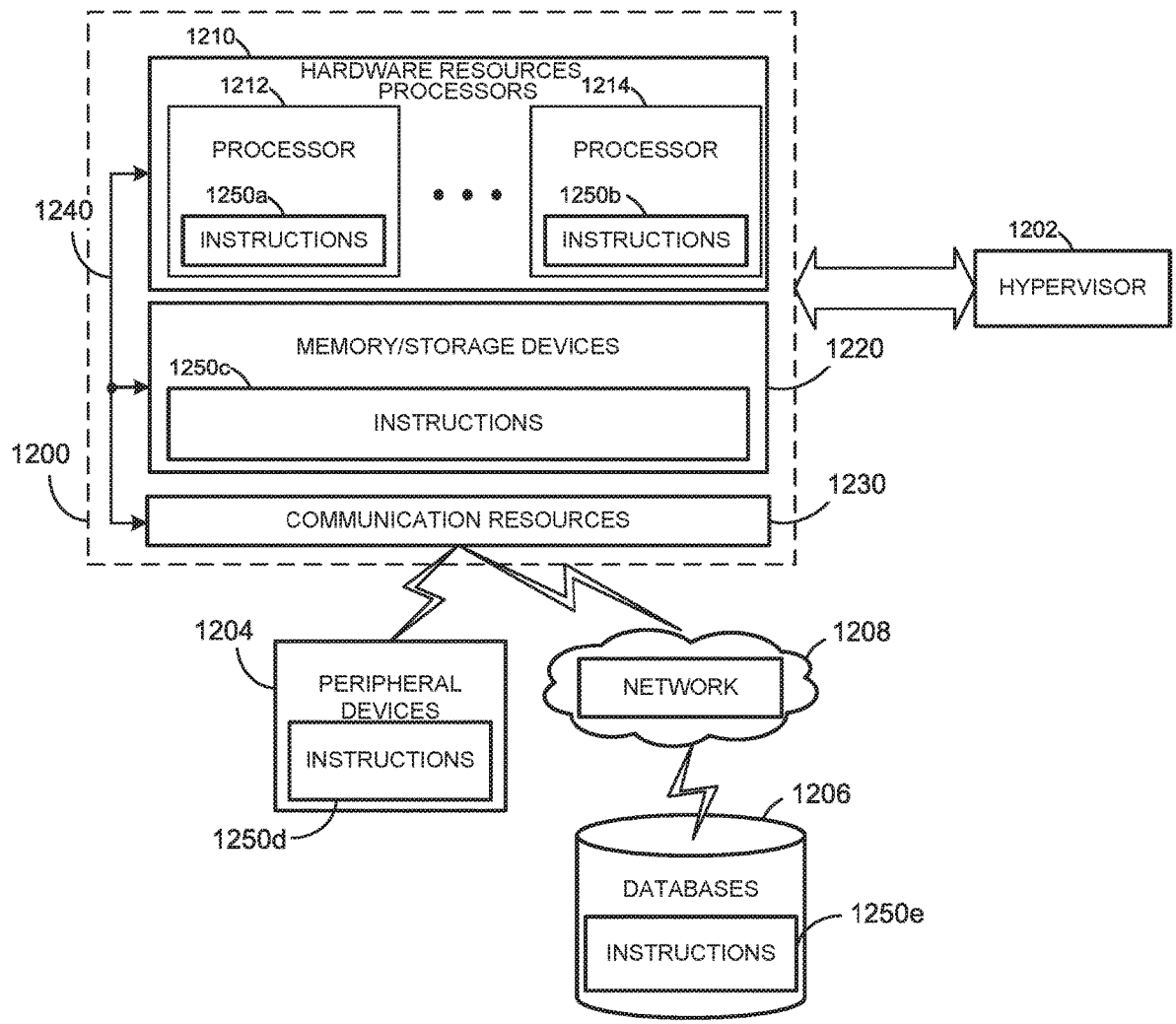
FIG. 12 is a block diagram illustrating components, in accordance with one or more example embodiments of the present disclosure, able to read instructions from a machine-readable or computer-readable medium (e.g., a non-transitory machine-readable storage medium) and perform any one or more of the methodologies discussed herein.

FIG. 12 is a block diagram illustrating one or more components, in accordance with one or more example embodiments of the present disclosure.

The one or more components able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250a and/or instructions 1250b may comprise software, a program, an application, an applet, an app, or other executable code for causing at least any of the processors 1210 to perform any one or more of the methodologies discussed herein. The instructions 1250a and/or instructions 1250b may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1250a and/or instructions 1250b, the memory/storage devices 1220, the peripheral devices 1204, and the databases 1206 are examples of computer-readable and machine-readable media.

In some embodiments, the electronic device(s), network (s), system(s), chip(s) or component(s), or portions or implementations thereof, of Figures herein may be configured to perform one or more processes, techniques, or methods as described herein, or portions thereof.

The following examples pertain to further embodiments.

Example 1 may include the Communication Service Management Function (CSMF) supported by one or more processors is to: receive the request to collect the NSI management data from Communication Service Customer; and send the response to Communication Service Customer with the result of the request.

Example 2 may include the method according to example 1 or some other example herein, wherein the CSMF supported by one or more processors, upon receipt of the request from Communication Service Customer, is to: send the request to collect the NSI management data to Network Slice Management Function (NSMF); and receive the result from NSMF about the request.

Example 3 may include the method according to examples 1 and 2 or some other example herein, wherein the NSMF supported by one or more processors is to: receive the request to collect the NSI management data from CSMF; and send the result to CSMF about the request; and collect the NSI management data.

Example 4 may include the method according to examples 1 and 3 or some other example herein, wherein the NSMF supported by one or more processors is to: inform CSMF about the availability of the NSI management data.

Example 5 may include the method according to examples 1 to 4 or some other example herein, wherein the CSMF, is to: receive the information from NSMF about the availability of the NSI management data; and/or get the NSI management data from NSMF; and/or inform Communication Service Customer about the availability of the NSI management data.

Example 6 may include the method according to examples 1 to 5 or some other example herein, wherein the Communication Service Customer: receives the information from CSMF about the availability of the NSI management data; and/or gets the NSI management data from CSMF.

Example 7 may include the method according to examples 1 and 2 or some other example herein, wherein the CSMF supported by one or more processors is to: inform Communication Service Customer from which NSMF the management data can be accessed.

Example 8 may include the method according to examples 1 to 3 or some other example herein, wherein the NSMF supported by one or more processors is to: inform Communication Service Customer about the availability of the NSI management data.

Example 9 may include the method according to examples 1, 2, 3, 7, and 8 or some other example, wherein the Communication Service Customer: receives the information from CSMF from which NSMF the management data can be accessed; and/or receives the information from NSMF about the availability of the NSI management data; and/or gets the NSI management data from NSMF.

Example 10 may include the method according to example 1 or some other example herein, wherein the CSMF supported by one or more processors is to: inform the Communication Service Customer from which NSMF the NSI management data can be requested and accessed; and/or send a request to NSMF to authorize the Communication Service Customer to collect the management data related to NSI directly from the NSMF.

Example 11 may include the method according to examples 1 and 10 or some other example herein, wherein the Communication Service Customer: sends the request to collect the NSI management data to Network Slice Management Function (NSMF); and receives the result from NSMF about the request; and/or receives the information from NSMF about the availability of the NSI management data; and/or gets the NSI management data from NSMF.

Example 12 may include the method according to examples 1, 10 and 11 or some other example herein, wherein the NSMF supported by one or more processors is to: authorize the Communication Service Customer to collect the management data related to NSI directly from the NSMF; and/or receive the request to collect the NSI management data from Communication Service Customer; and send the result to Communication Service Customer about the request; and collect the NSI management data; and/or inform Communication Service Customer about the availability of the NSI management data.

Example 13 may include the method according to examples 1 to 12 or some other example herein, wherein the NSI management data include NSI related performance measurements and/or the alarm information.

Example 14 may include the NSMF supported by one or more processors is to: coordinate the management actions for a NSI to prevent and/or resolve the conflict; and/or receive the policy for coordination of the management actions for a NSI.

Example 15 may include the method according to example 14 or some other example herein, wherein the management actions include automated reconfiguration of NSI, automated optimization of NSI, automated healing of NSI and manual modifications of NSI.

Example 16 may include the Network Slice Subnet Management Function (NSSMF) supported by one or more processors is to: coordinate the management actions for a Network Slice Subnet Instance (NSSI) to prevent and/or resolve the conflict; and/or receive the policy for coordination of the management actions for a NSSI.

Example 17 may include the method according to example 16 or some other example herein, wherein the management actions include automated reconfiguration of NSSI, automated optimization of NSSI, automated healing of NSSI and manual modifications of NSSI.

Example 18 may include an apparatus, comprising logic, at least a portion of the logic being in hardware, the logic comprising computer-executable instructions to: identify a first network slice instance management action received from a communication service management function, wherein the first network slice instance management action is associated with a first modification of an active network slice instance for one or more devices of a cellular network; identify a second network slice instance management action received from the communication service management function, wherein the second network slice instance management action is associated with a second modification of the active network slice instance, and wherein the second modification conflicts with the first modification; and determine a coordination between the first modification and the second modification based on a received policy.

Example 19 may include a computer-readable medium (e.g., a transitory or non-transitory computer-readable medium) storing computer-executable instructions which when executed by one or more processors result in performing operations comprising: identifying a first network slice subnet instance management action received from a communication service management function, wherein the first network slice subnet instance management action is associated with a first modification of an active network slice subnet instance for one or more devices of a cellular network; identifying a second network slice subnet instance management action received from the communication service management function, wherein the second network slice subnet instance management action is associated with a second modification of the active network slice subnet instance, and wherein the second modification conflicts with the first modification; and determining a coordination between the first modification and the second modification based on a received policy.

Example 20 may include a method, comprising: identifying, by one or more processors, a first network slice subnet instance management action received from a communication service management function, wherein the first network slice subnet instance management action is associated with a first modification of an active network slice subnet instance for one or more devices of a cellular network; identifying a second network slice subnet instance management action received from the communication service management function, wherein the second network slice subnet instance management action is associated with a second modification of the active network slice subnet instance, and wherein the second modification conflicts with the first modification; and determining a coordination between the first modification and the second modification based on a received policy.

Example 21 may include an apparatus, comprising logic, at least a portion of the logic being in hardware, the logic comprising computer-executable instructions to: identify a management data request received from a communication service customer, wherein the management data request is associated with a network slice instance used by one or more devices of a cellular network; cause to send an indication of the management data request to a network slice management function associated with the network slice instance; identify management data received from the network slice management function, the management data associated with the network slice instance; and cause to send a response to the communication service customer, the response associated with the management data request.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 27 may include a signal as described in or related to any of examples 1-21, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus, comprising logic, at least a portion of the logic is in hardware, the logic comprising computer-executable instructions to:
    identify a first network slice instance management action request, wherein the first network slice instance management action request is associated with a first modification request of an active network slice instance for one or more devices of a cellular network;
    identify a second network slice instance management action request, wherein the second network slice instance management action request is associated with a second modification request of the active network slice instance, and wherein the second modification request conflicts with the first modification request; and
    determine a coordination between the first modification request and the second modification request based on a received policy,
    wherein the logic is arranged for a 3GPP wireless network, wherein the first network slice instance management action request is associated with an automated reconfiguration of the active network slice instance, and wherein the second network slice instance management action request is associated with an automated optimization of the active network slice instance.

2. An apparatus, comprising logic, at least a portion of the logic is in hardware, the logic comprising computer-executable instructions to:
    identify a first network slice instance management action request, wherein the first network slice instance management action request is associated with a first modification request of an active network slice instance for one or more devices of a cellular network;
    identify a second network slice instance management action request, wherein the second network slice instance management action request is associated with a second modification request of the active network slice instance, and wherein the second modification request conflicts with the first modification request; and
    determine a coordination between the first modification request and the second modification request based on a received policy,
    wherein the first network slice instance management action request is associated with an automated reconfiguration or optimization of the active network slice instance, and wherein the second network slice instance management action request is associated with an automated healing of the active network slice instance.

3. An apparatus, comprising logic, at least a portion of the logic is in hardware, the logic comprising computer-executable instructions to:
    identify a first network slice instance management action request, wherein the first network slice instance management action request is associated with a first modification request of an active network slice instance for one or more devices of a cellular network;
    identify a second network slice instance management action request, wherein the second network slice instance management action request is associated with a second modification request of the active network slice instance, and wherein the second modification request conflicts with the first modification request; and
    determine a coordination between the first modification request and the second modification request based on a received policy,
    wherein the first network slice instance management action request is associated with an automated reconfiguration, optimization or healing of the active network slice instance, and wherein the second network slice instance management action request is associated with a manual modification of the active network slice instance.

* * * * *